United States Patent [19]

Wiewiorowski et al.

[11] Patent Number: 4,670,229
[45] Date of Patent: Jun. 2, 1987

[54] CYCLIC PROCESS FOR RECOVERING METAL VALUES AND ALUMINA FROM SPENT CATALYSTS

[75] Inventors: Edward I. Wiewiorowski; Luther R. Tinnin, both of New Orleans; Ranko Crnojevich, Gretna, all of La.

[73] Assignee: Amax Inc., Greenwich, Conn.

[21] Appl. No.: 861,690

[22] Filed: May 9, 1986

[51] Int. Cl.$^4$ .................. C01G 31/00; C01G 39/00
[52] U.S. Cl. ............................ 423/55; 423/53;
423/62; 423/66; 423/68; 423/127; 423/131;
423/140; 423/147; 423/150; 75/101 R; 75/108;
75/119; 75/121; 502/25
[58] Field of Search ............ 423/68, 66, 54, 63,
423/67, 55, 53, 62, 127, 131, 140, 147, 150;
502/25; 75/101 R, 108, 119, 121

[56] References Cited

U.S. PATENT DOCUMENTS 3,773,890 11/1973 Fox et al. ....................... 423/68
4,145,397 3/1979 Toida et al. .................... 423/67
4,495,157 1/1985 Sebenik et al. ................ 423/54

Primary Examiner—John Doll
Assistant Examiner—Robert L. Stoll
Attorney, Agent, or Firm—Michael A. Ciomek; Eugene J. Kalil

[57] ABSTRACT

Metal values and alumina are recovered from spent, usually oily, catalysts by oxygen pressure leaching with sodium hydroxide and/or sodium aluminate to dissolve molybdenum, vanadium and/or tungsten and provide a solid, filterable residue containing alumina and cobalt and/or nickel, the residue is digested with sodium hydroxide to give a sodium aluminate solution and a residue enriched in nickel and/or cobalt, alumina is recovered from the sodium aluminate solution as a solid and the remaining supernatant solution is recycled to the oxygen pressure leaching step wherein the alumina content of the aluminate solution is precipitated and a bleed for metals in the aluminate solution is provided.

12 Claims, 1 Drawing Figure

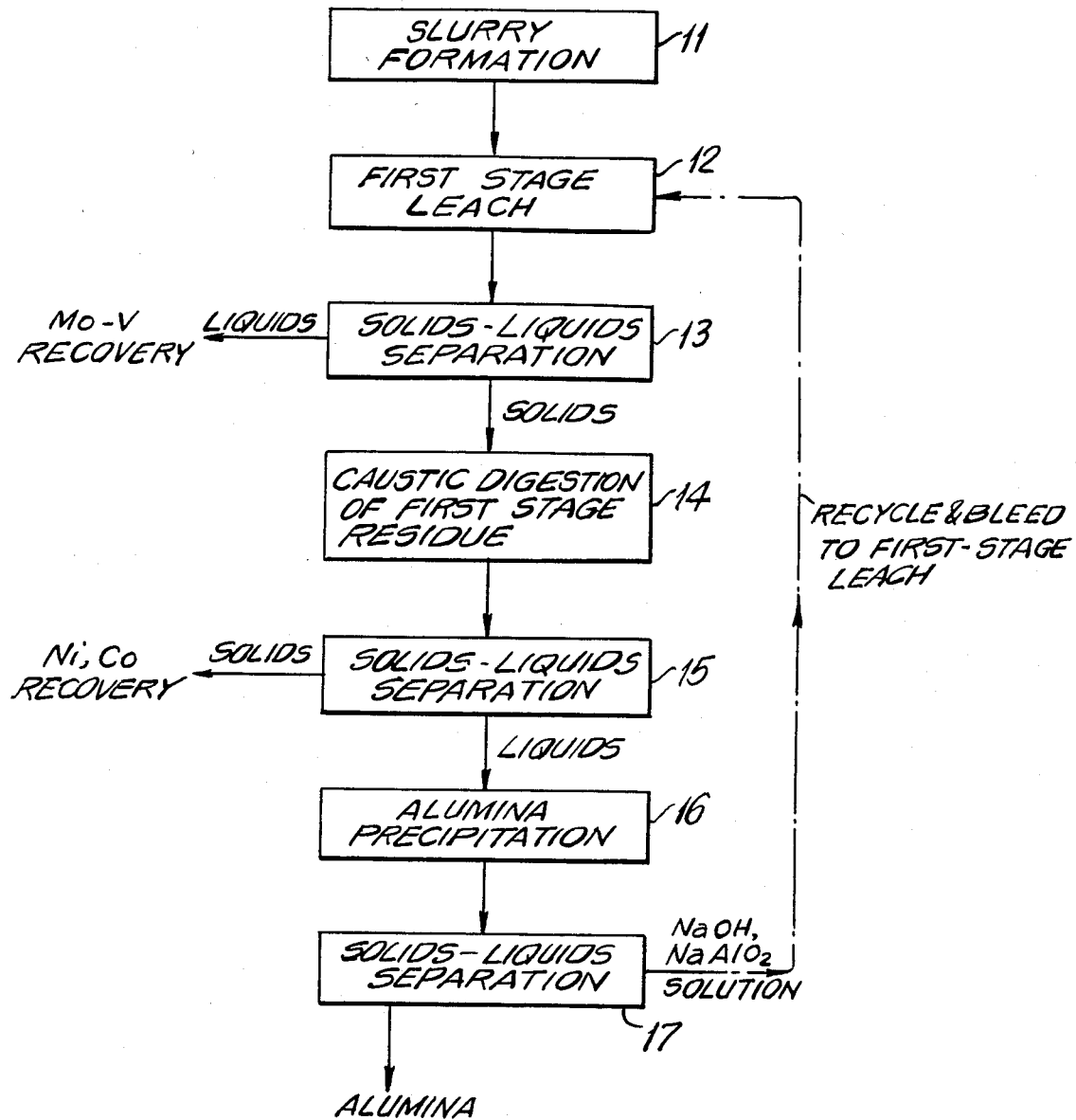

CYCLIC PROCESS FOR RECOVERING METAL VALUES AND ALUMINA FROM SPENT CATALYSTS

The present invention is directed to the recovery of valuable metals including molybdenum, vanadium, nickel and cobalt from spent catalyst using sodium hydroxide and/or sodium aluminate as lixiviant.

BACKGROUND OF THE INVENTION AND THE PRIOR ART

The art has recognized for a number of years now the need for upgrading various petroleum feedstocks to remove therefrom various contaminants including sulfur, metals such as nickel, vanadium and iron. For example, it is pointed out in U.S. Pat. No. 4,500,495 that this objective is accomplished by processing the feedstock with a catalyst in the presence of hydrogen. The catalysts employed generally have a solid support such as alumina provided with catalytic metals such as molybdenum or tungsten with either nickel or cobalt. As the catalyst is used, metals and sulfur from the feedstock deposit thereon and/or combine therewith until the activity of the catalyst is impaired to the extent that the desired product quality in the hydrodesulfurized feedstock is no longer achieved. The resulting spent catalyst thus comprises catalytic metals, an inorganic support matrix, e.g., alumina ceramic balls or other shapes, metals removed from the feedstock, sulfur compounds and residual oil. Substantial quantities of spent catalyst on the order of many tons are now being generated annually as poorer grades of feedstock are now being treated. The spent catalyst raises problems on the one side in relation to environmentally acceptable disposition due to its generally oily, sticky physical nature and high sulfur content, and on the other side offers the possibility of reclaiming valuable metals from it.

Although many proposals have been reported in the literature, none of the proposals made to date has been completely acceptable from the standpoint of recovering metals and alumina present in the spent catalyst in marketable form while recovering sulfur as sodium sulfate, and yielding solid, gaseous and/or liquid by-products which may safely be released to the environment. U.S. Pat. No. 4,495,157 proposed oxygen pressure leaching of spent hydrodesulfurization catalyst using sodium carbonate in the leach slurry. The process and other proposals are operative but are still subject to improvement by way of reducing reagent cost, improving metal recovery, improving filterability and reducing weight and volume of solids generated in the leaching steps and affording lower temperatures and pressures for leaching.

Spent hydrodesulfurization catalysts can vary considerably in composition and in response to treatment. Thus, the materials may contain up to 16% of metal from the group consisting of molybdenum and tungsten, up to 15% vanadium, at least one metal from the group consisting of up to 12% nickel and up to 6% cobalt, up to 12% sulfur, up to 10% coke, up to 20% oil and the balance alumina. Because of the susceptibility of the material to undergo spontaneous combustion, no economical means presently exists for disposal of the material in an acceptable fashion.

SUMMARY OF THE INVENTION

The invention is directed to the treatment of spent catalysts, particularly spent hydrodesulfurization catalysts, to recover metal values contained therein in marketable form, to recover the sulfur content thereof as sodium sulfate, to recover the alumina content in marketable form, to convert the hydrocarbon and carbon contents to carbon dioxide and water and to conduct the process in an environmentally benign manner. The spent catalyst, which may for example contain, by weight, about 1% to about 10% molybdenum, about 1% to about 15% vanadium, about 1% to about 12% nickel, about 1% to about 6% cobalt, about 2% to about 12% sulfur, about 1% to about 40% carbonaceous materials, up to about 20% oil and the balance alumina, is slurried with water and sodium hydroxide and/or sodium aluminate in an amount at least stoichiometrically sufficient to convert, in the presence of oxygen, molybdenum to sodium molybdate, tungsten to sodium tungstate, vanadium to sodium vanadate and sulfur to sodium sulfate. The slurry is heated in a pressure vessel to a temperature of about 150° to 250° C. (300° to 500° F.) and a total pressure of about 120 to about 600 psig, e.g., 150 to 400 psig, with oxygen at an overpressure of at least about 25 to about 100 psig in an amount sufficient to oxidize the sulfur and carbon compounds in the catalyst substantially completely. The generated carbon dioxide is continuously bled from the system to maintain minimal $CO_2$ overpressures. Retention time of the reactants under pressure is sufficiently long to solubilize molybdenum as molybdate and vanadium as vanadate while oxidizing organic matter and carbon and sulfur in the catalyst to sulfate, carbon dioxide and water. The caustic addition, which can comprise sodium aluminate obtained by recycling or from other sources, and the temperature should be controlled such that the leach slurry is discharged at a pH not exceeding about 9, e.g., about 7 to about 9, to provide high extraction of molybdenum and vanadium, good filterability in the leach solids and a low aluminum content, not exceeding about 100 ppm, preferably not more than 50 ppm, in the leach liquor. The aluminum, nickel and cobalt contents remain in the leach solids, while molybdenum and vanadium (and tungsten, if any be present) are substantially completely dissolved.

The leach products are separated, with the leach liquor being worked up for recovery of molybdenum and vanadium. For example, the leach residue may be digested with sodium hydroxide to dissolve alumina therefrom as sodium aluminate, using a caustic soda in the digestion slurry at a concentration sufficient to dissolve alumina, e.g., a pH of at least about 14. The digested solids contain essentially all the nickel and cobalt present in the original catalyst and may be worked up for recovery of these metals. Digestion may be accomplished in the temperature range of about 200° C. to about 300° C., preferably in a closed vessel adapted to withstand the steam pressure associated with such temperature, using oxidizing conditions such as an oxygen overpressure of up to about 100 psig, e.g., about 25 to about 100 psig. Supplemental caustic soda can be introduced into the leach to maintain the needed high pH. The leach solution can be treated for alumina recovery and to provide a sodium aluminate solution which can be recycled to leach further spent catalyst. Recycling provides efficient use of caustic and also provides a bleed of molybdenum and vanadium from the digestion circuit with improved recovery of these metals from the first stage leach solution. Aluminum compounds present in the recycle solution are precipitated in the first stage leach solids in readily filterable form by a process believed to be hydrothermal, mineral forming, precipitation. Other means may be employed to work up the initial leach residue. The recovery of molybdenum and vanadium and treatment of the leach residue may be accomplished in accordance with the teachings of U.S. Pat. No. 4495157, which patent is incorporated herein by reference.

DESCRIPTION OF THE DRAWING

The drawing depicts a flow sheet for carrying out the process embodying the invention with recycle of sodium aluminate generated therein.

DETAILED DESCRIPTION OF THE PROCESS

The invention will now be described in conjunction with the drawing in which reference character 11 depicts the slurry forming operation in which the spent catalyst is mixed with an aqueous sodium hydroxide or an aqueous sodium aluminate solution or mixtures thereof to emulsify the oil in the catalyst and form a stable slurry from which support balls or other shapes, if any, are contained in the catalyst, can be recovered for re-use by wet screening. Operation 11 may be conducted in a ball mill or other size reduction equipment at ambient or elevated temperatures. The aqueous alkaline slurry is charged with the addition of any needed caustic material to provide the necessary initial caustic content of, for example, 120% to 180% of stoichiometric to first stage leach 12 which is preferably conducted in an autoclave. The alkali metal materials are supplied in quantity sufficient to provide a hydroxyl ion content of about 5 to 40 gpl, e.g., about 15 to 35 gpl. A solids content in the slurry of about 50 to about 200 gpl, e.g., about 70 to about 120 gpl, is employed. The autoclave charge is brought up to a temperature of at least about 350° F. and oxygen at an overpressure of about 25 to about 150 psig $O_2$ is introduced. Further oxygen may be introduced during the run and a compensating bleed of the reaction atmosphere to remove carbon dioxide may be provided. Sulfur oxides are not discharged. The oxidative leach process is exothermic. The run is conducted for sufficient time to accomplish substantially complete oxidation of the oil, carbon and sulfur in the catalyst and conversion of molybdenum and vanadium to sodium molybdate and sodium vanadate. Final solution pH should not exceed pH 9 and reaction temperature should be approximately 400° F. Higher temperatures and pressures may be employed to advantage, but economics essentially dictate operating conditions. Retention times in the autoclave exceed 30 minutes and may be up to 2 hours or more, with 90 minutes being generally sufficient to achieve satisfactory extraction of metals and depression of alumina.

The contents of the autoclave then proceed to solids-liquid separation 13 wherein the solids containing aluminum, nickel and cobalt are separated from the liquid containing dissolved molybdenum and vanadium. The solids may be washed to remove supernatant liquid remaining and the washings will accompany the leach liquor to recovery of metals from the liquor.

The solids then proceed to caustic digestion 14 where sodium hydroxide solution maintained at a pH of at least 14 extracts the alumina from the first-stage solids and leaves a solid "black mud" containing the nickel and cobalt mostly in oxide form. The caustic digestion product is then taken to solids-liquids separation 15. The solids from this operation are taken to a nickel-cobalt recovery operation while the caustic liquid of high aluminum content is taken to alumina precipitation operation 16 in which a portion of the aluminum content is recovered as an oxide by crystallization on aluminum hydroxide seed. The product of operation 16 is transferred to solids-liquids separation 17. The alumina solids are washed and become a product while the sodium hydroxide-sodium aluminate liquid is recycled to the first-stage leach 12. In process terms, the bleed of caustic solution from 17 to leach 12 is very important as it prevents buildup of molybdenum and vanadium in solution in the latter stages of the process. Recycling also provides highly efficient usage of caustic supplied to the process. It is to be appreciated that, while high solubilization of molybdenum (and of tungsten, if present) and vanadium is accomplished in the first-stage leach, small amounts of these elements will remain with the leach solids and will be carried along in further processing. Removal of these metals is necessary as otherwise product contamination occurs and continuous operation becomes difficult.

Some examples will now be given:

EXAMPLE 1

A spent hydrodesulfurization catalyst which contained by weight, 14.6% oil, 5.7% support balls, 4.1% molybdenum, 7% vanadium, 1.3% nickel, 1.4% cobalt, 7.4% sulfur, 6.3% carbon, 1.8% sodium, 0.17% calcium, 0.25% silicon, 0.03% chlorine and the balance alumina and oxygen was mixed with water and 150% stoichiometric sodium hydroxide (25 grams per liter sodium hydroxide) and fed to a 7-inch diameter carbon lined ball mill. The weight of grinding balls used was approximately the same as the weight of the catalyst feed. The balls were of mixed sizes; 50% 1-inch, 25% each ¾ inch and ½ inch. The charge was ground for four hours and the ball mill contents were wet screened through a ½-inch screen to separate the grinding balls and then through a ¼-inch screen to separate and recover the catalyst support balls. The support balls were hard and did not show any weight loss in the process. They could be re-used for fresh catalyst preparation. The balls and screens were water washed to bring the slurry to the desired solids concentration of 90 grams per liter. The slurry solids were 90% minus 200 mesh and 85% minus 400 mesh.

1000 milliliters of the slurry were charged into an agitated 2 liter Parr autoclave and heated to a leaching temperature 10° F. below the desired test temperature. Oxygen at 100 psig was injected and the mixture then reacted for 90 minutes. The leach solution was assayed for Al and the metal extraction was calculated based on the assay of the washed, dried (at 120° C. (250° F.)) leach solids. Results are shown in Table 1:

TABLE 1

| Temp. °F. | Temp. °C. | Oxygen Partial Pressure, Psig | Total Press. (psig) | Discharge pH | System | Extraction % MO | Extraction % V | Extraction % S | Alumina Conc. In Leach gpl Al |
|---|---|---|---|---|---|---|---|---|---|
| 200 | 93 | Atmospheric | Atmospheric | 12 | Open | 89 | 85 | 10 | 6.0 |
| 300 | 149 | 100 | 150 | 11.1 | Pressurized, Venting Applied | 97 | 90 | 92 | 1.5 |
| 392 | 200 | 100 | 330 | 8.0 | Pressurized, Venting Applied | 97 | 90 | 98 | 0.070 |

EXAMPLE 2

This example demonstrates the effect of temperature on the pH of the reaction system at the end of the leach process.

A slurry having a solids concentration of 90 grams per liter (excluding oil and support balls) was reacted with 25 grams per liter of sodium hydroxide (150% of the stoichiometric requirement) at an oxygen overpressure for 90 minutes in a Parr autoclave with the following results:

TABLE 2

| Temp. °F. | Pressure psig | Discharge pH | Al gpl | Metals Extraction, % (Solids Basis) V | Metals Extraction, % (Solids Basis) Mo |
|---|---|---|---|---|---|
| 302 | 154 | 11.0 | 1.49 | 96.7 | 96.5 |
| 347 | 214 | 9.7 | .16 | 95.6 | 97.6 |
| 392 | 310 | 8.7 | 0.03 | 92.6 | 98.0 |

The tests show high metal extractions for molybdenum and vanadium. The tests also show that terminal pH control in the leach is important to reduce soluble aluminum in the leach solution to a value below 100 ppm, preferably below 50 ppm. This can be achieved by the combined effect of temperature which should be at least about 390° F. (200° C.) and which should be controlled in the range of about 7 to about 8.8 or 9. Solids discharged from the autoclave show good settling and filtration characteristics.

EXAMPLE 3

This Example demonstrates that the lixiviant employed in the first step leach can contain high concentrations of soluble aluminum while still retaining good results in terms of limiting soluble aluminum in the resulting leach liquor to low values and still obtaining high recoveries of molybdenum and vanadium. A series of leaching tests was conducted using as lixiviant a mixture of sodium aluminate solution containing 184 gpl Al and 50% sodium hydroxide solution mixed in varying proportions.

The test catalyst was the same as that described in Example 1, the solids concentration was 90 gpl, the autoclave charge temperature was 392° F., the retention time was 90 minutes and oxygen overpressure was 100 psig.

Six tests were conducted, with the stoichiometric amounts of sodium hydroxide and sodium aluminate being given in Table 3 and the test results being given in Tables 4A and 4B. It was assumed that sodium from NaOH and sodium from sodium aluminate both contributed to leaching power and stoichiometry was based upon the conversion of Mo to $Na_2MoO_4$, vanadium to $NaVO_3$ and sulfur to $Na_2SO_4$.

TABLE 3

TEST CONDITIONS

| Test No. | Sodium Hydroxide Addition (% of Stoich. Req.) | Sodium Aluminate Addition (% of Stoich. Req.) | Total Reagents Addition (% of Stoich. Req.) | Al Addition to Feed gpl Soluble Al |
|---|---|---|---|---|
| 1 | 97.3 | 46.9 | 144.2 | 7.82 |
| 2 | 131.8 | 18.7 | 150.5 | 3.13 |
| 3 | 113 | 37.5 | 150.5 | 6.26 |
| 4 | 147 | 28.1 | 175.1 | 4.69 |
| 5 | 144.3 | 56.2 | 200.5 | 9.38 |
| 6 | 163 | 37.5 | 200.5 | 6.26 |

TABLE 4A

TEST RESULTS
Leach Solution

| Test No. | Final pH | EMF mV | V gpl | Mo gpl | Al gpl | Na gpl |
|---|---|---|---|---|---|---|
| 1 | 7.7 | 150 | 4.40 | 4.20 | .04 | 15.0 |
| 2 | 6.6 | 205 | 4.92 | 4.33 | .03 | 15.0 |
| 3 | 5.8 | 260 | 4.01 | 3.67 | .03 | 15.0 |
| 4 | 7.54 | 240 | 5.02 | 4.23 | .03 | 17.0 |
| 5 | 6.98 | 220 | 4.59 | 4.23 | .04 | 16.0 |
| 6 | 7.8 | 118 | 4.95 | 4.51 | .04 | 19.0 |

TABLE 4B

| Test No. | Wt. Gain % | Leach Solids V % | Leach Solids Mo % | Leach Solids Al % | Leach Solids NA % | Leach Solids S % | Metal Extrac. (Solids Basis) V % | Metal Extrac. (Solids Basis) Mo % | Metal Extrac. (Solids Basis) S % |
|---|---|---|---|---|---|---|---|---|---|
| 1 | 1.6 | 1.05 | .17 | 15.7 | .62 | .20 | 84.4 | 95.8 | 97.3 |
| 2 | 5.9 | .02 | .16 | 19.4 | 1.6 | .35 | 86.1 | 96.0 | 95.0 |
| 3 | 7.1 | 1.22 | .31 | 15.4 | .51 | .10 | 81.3 | 91.9 | 98.5 |
| 4 | 8.1 | .68 | .10 | 18.5 | 1.2 | .20 | 89.5 | 97.4 | 97.1 |
| 5 | 28.6 | .97 | .14 | 21.6 | 1.3 | .17 | 82.2 | 95.6 | 97.0 |
| 6 | 22.6 | .63 | .10 | 22.8 | 2.3 | .36 | 89.0 | 97.0 | 94.0 |

The tests show that sodium hydroxide-sodium aluminate systems can be used as lixiviants in the first-stage leach while providing aluminum contents in the leach solution below 50 ppm, with molybdenum extractions of 95% or more and vanadium extractions on the order of 90%. The pH range for discharge liquors should be about 7 to about 9. The tests confirm that solutions from alumina processing can be recycled to the first-stage leach thereby providing a bleed for molybdenum, vanadium and any organics. Good filterability of resulting leach solids is obtained.

EXAMPLE 4

This example shows that a sodium aluminate solution alone with no addition of virgin sodium hydroxide can be applied as lixiviant. A series of leaching tests was carried out on the catalyst described in Example 1 using mother liquor from the alumina processing circuit. This solution assayed 24.5 gpl Al (42.3 gpl Al$_2$O$_3$) 5.5 gpl V and 3.1 gpl Mo. The sodium hydroxide concentration in the sodium aluminate solution was 65.7 gpl "free NaOH", 102 gpl total NaOH. About 36% of the leaching power was supplied by sodium aluminate in all the tests which were carried out with an initial solids concentration of 90 gpl, at 200° C. (392° F.), with an oxygen overpressure of 100 psig O$_2$ and retention time 90 min. The results are presented in Table 5.

TABLE 5

| Reagent Addition Of Stoich. Require. | Discharge pH | Aluminum Concentration ppm Al Initial | Aluminum Concentration ppm Al Residual | Aluminum Depression % | Metals Extraction % Mo | Metals Extraction % V |
|---|---|---|---|---|---|---|
| 111.6 | 5.9 | 6600 | 40 | 99.6 | 71.0 | 86.3 |
| 148.6 | 7.0 | 8800 | 50 | 99.6 | 81.5 | 95.9 |
| 163.8 | 7.1 | 9700 | 40 | 99.7 | 81.9 | 94.4 |
| 181.0 | 8.1 | 10700 | 50 | 99.7 | 90.0 | 98.3 |

The tests show that recycled sodium aluminate solutions without the addition of fresh sodium hydroxide can be applied as lixiviant and desired metal extractions as well as selectivity can be achieved.

EXAMPLE 5

A de-oiled catalyst from a different source was used in this series of tests; it contained 0.8% oil and assayed on no oil basis: 3.50% Mo, 15.5% V, 2.34% Ni, 0.78% Co, 22.1% Al and 14.4% S. All tests were carried out with 90 gpl solids initially in the system at 392° F. with an oxygen overpressure of 100 psig O$_2$ and a retention time of 90 min. The results are shown in Table 6.

TABLE 6

| Reagent Dosage % Stoichiometric Requirement | Leach Solution pH | Leach Solution Ni ppm | Leach Solution Al ppm | Metals Extraction Mo % | Metals Extraction V % | Metals Extraction S % |
|---|---|---|---|---|---|---|
| 72 | 2.7 | 850 | 800 | 79.7 | 76.9 | 96.2 |
| 95 | 5.6 | 230 | 30 | 86.3 | 82.7 | 96.7 |
| 100 | 4.9 | 230 | 30 | 92.4 | 84.3 | 96.5 |
| 111 | 6.0 | 200 | 10 | 94.9 | 82.9 | 96.7 |
| 117 | 6.9 | 10 | 10 | 96.9 | 91.9 | 96.9 |
| 117 | 6.8 | 10 | 10 | 95.7 | 85.5 | 95.4 |
| 121 | 8.4 | 10 | 20 | 98.8 | 92.7 | 97.0 |

The results show the interaction between meeting the stoichiometric requirement for caustic and discharge pH and the response of alumina and nickel concentration in the leach solutions. The aluminum concentration can be controlled at below 10 ppm Al when process parameters are accurately controlled. Temperature, reagent and catalyst dosage as well as discharge pH are the key variables, the interaction of those variables determines the alumina depression in the hydrothermal process as well as metals extractions. De-oiled catalysts can be treated in accordance with the invention.

EXAMPLE 6

A spent catalyst from a different source than that of the material described in the previous examples and containing 7.0% oil assayed on a "no oil" basis 3.7% Mo, 12.8% V, 1.3% Co, 20% Al, 0.06% Cu, 0.34% Fe, 1.6% Si, 0.51% Na, 3.1% Ni and 12.6% S was leached with sodium hydroxide, at 90 gpl solids ("no oil" basis) at 100 psig oxygen overpressure for 90 minutes residue time. Two tests were run with assays of the leach solution and assays of the leach solids being given in Table 7.

TABLE 7

| | TEST CONDITIONS | | | |
|---|---|---|---|---|
| Test No. | Temp. °F. | Reagent Addition (% Stoich. Req.) | Leach Solution pH | Leach Solution Al gpl |
| 1 | 300 | 143 | 11.4 | 11.1 |
| 2 | 400 | 143 | 6.9 | .05 |

| | TEST RESULTS | | | | | | |
|---|---|---|---|---|---|---|---|
| | Leach Solids | | | | | Metals Extraction (Solids Bas.) | |
| Test No. | Mo % | V % | Ni % | Co % | Al % | Mo % | V % |
| 1 | .39 | 1.57 | 3.40 | 1.45 | 18.8 | 91.0 | 89.5 |
| 2 | .12 | 1.14 | 3.26 | 1.43 | 20.2 | 97.0 | 91.9 |

The tests confirmed that even when a spent HDS catalyst of a distinctly different composition is used, high extractions of Mo and V were obtained and the aluminum concentration in the leach liquor can be controlled at about or below 50 ppm Al by the combined effect of temperature and pH.

EXAMPLE 7

This example illustrates the leaching of alumina from the residue of the first leaching step by caustic digestion. A residue from selective caustic alumina leach assaying 0.4% Mo, 2.77% V, 20.8% Al, 2.46% Ni, 1.36% Co and 0.51% Fe was treated with concentrated caustic solution in an agitated Parr autoclave for 2 hours.

Five tests were conducted, with the results shown in Table 8. The test temperature was 350° F., except for Test No. 4, which was conducted at 400° F. Initial solids concentration was 225 gpl except for test No. 5 in which the solids concentration was 150 gpl. A caustic concentration of 150 gpl was used in Test No. 1, with the concentration in Tests Nos. 2 to 5 being 250 gpl NaOH. An oxygen overpressure of 100 psig was used in Test No. 3, with no oxygen overpressure being used in the remaining tests.

TABLE 8

| | Leach Liquor Comp. | | Leach Solids Composition | | | Aluminum Extraction |
|---|---|---|---|---|---|---|
| Test No. | Soluble Al gpl Al$_2$O$_3$ | Free Caustic apl NaOH | Ni % | Co % | Al % | Al % |
| 1 | 89.1 | 70.9 | 5.91 | 3.25 | 5.99 | 82.3 |
| 2 | 102.0 | 183.5 | 6.55 | 3.6 | 2.18 | 91.8 |
| 3 | 73.8 | 117.1 | 7.02 | 4.27 | 2.19 | 93.7 |
| 4 | 103.7 | 171.5 | 6.49 | 3.53 | 1.88 | 93.7 |
| 5 | 68.3 | 192.0 | 6.63 | 3.94 | 1.68 | 94.8 |

The results show that over 90% of the aluminum can be extracted from the first stage leach residue. The residue from this leaching step contains all the nickel and cobalt from the feed material. After separation of these solids by filtration or centrifugation the solids can be washed and dried and marketed as nickel-cobalt cake. The leach solution is directed to an alumina precipitation step, wherein alumina is partly removed from solution by means of seeded crystallization. A black (containing cobalt and nickel) rather than red (containing iron) residue is formed. The solids concentration and alumina caustic ratio have a predominant effect on the process. Higher temperatures are beneficial. The process can be carried out with or without oxidation; the presence of oxygen is needed when decomposition of carbonaceous compounds, contained in the system, is desired.

EXAMPLE 8

This Example illustrates separation of alumina from the caustic digestion liquor by seeded crystallization. A caustic digestion leach liquor containing about 60.4 grams per liter of soluble aluminum, 118 grams per liter Na, 3.2 grams per liter Mo, 5.7 grams per liter V in the amount of one liter was treated in an agitated batch reactor with an addition of 50 grams per liter fine aluminum hydroxide seed for a total retention time of 72 hours, the temperature for the first 48 hours being 180° F., with the temperature for the last 24 hours being 130° F. The concentration of soluble aluminum as a function of time is shown in Table 9.

TABLE 9

| Crystallization Time Hrs. | Temperature Maintained During Time Interval °F. | Conc. of Soluble Al in Solution gpl Al | Al Crystallization Rate lb. $Al_2O_3$/gal./hr. |
|---|---|---|---|
| Initial | — | 60.4 | — |
| 24 | 180 | 57.5 | 0.0018 |
| 48 | 180 | 32.5 | 0.016 |
| 72 | 130 | 24.5 | 0.0052 |

The leach liquor from the first stage leach can be treated to precipitate molybdenum therefrom as molybdenum sulfide. The remaining solution after molybdenum sulfide separation can be treated with sodium hydroxide to precipitate a hydroxide of tetravalent vanadium. Sodium sulfate can be recovered from the remaining solution by crystallization.

While the term "oxygen leaching under hydrothermal conditions" is employed herein, it is to be appreciated that air may be used as an oxygen source, although higher pressures would then be needed.

Although the present invention has been described in conjunction with preferred embodiment, it is to be understood that modifications and variations may be resorted to without departing from the spirit and scope of the invention, as those skilled in the art will readily understand. Such modifications and variations are considered to be within the purview and scope of the invention and appended claims.

We claim:

1. The process for treating spent alumina catalyst containing molybdenum, vanadium and at least one metal from the group consisting of nickel and cobalt to recover the constituents thereof which comprises the steps of:
   (a) oxygen pressure leaching an aqueous slurry of said catalyst at a temperature of at least about 300° F. with an alkali from the group consisting of sodium aluminate and sodium hydroxide to dissolve molybdenum and vanadium selectively from said catalyst to provide, at the conclusion of the leach, an aqueous solution having a pH not greater than about pH 9 and containing no more than about 100 ppm aluminum while retaining alumina along with catalyst-contained nickel and cobalt in a residue;
   (b) separating the resulting aqueous solution containing said molybdenum and vanadium from said residue;
   (c) digesting said residue with sodium hydroxide in a concentration at least sufficient to dissolve alumina to provide a caustic solution containing said aluminum and a residue containing said nickel and cobalt;
   (d) separating said aluminum-containing solution from said residue;
   (e) precipitating alumina from said aluminum-containing solution;
   (f) separating said precipitated alumina from the supernatant caustic solution; and
   (g) recycling caustic solution from step (f) to said selective leaching step whereby soluble aluminum in said caustic solution is converted to an insoluble mineral.

2. The process in accordance with claim 1 wherein said catalyst contains, by weight, about 1% to about 16% molybdenum, about 1% to about 15% vanadium, up to about 12% nickel, up to about 6% cobalt, about 2% to about 12% sulfur, about 1% to about 10% coke, up to about 25% oil with the balance essentially alumina.

3. The process in accordance with claim 1 wherein said oxygen pressure leaching step is accomplished at a temperature of at least about 200° C. to limit the solubilization of aluminum from said spent catalyst to a value not exceeding about 0.1 gpl in said leach solution.

4. The process in accordance with claim 1 wherein said alkali in said oxygen pressure leaching step is in a concentration of about 5 to about 40 gpl of hydroxyl ion.

5. The process in accordance with claim 1 wherein the residue containing nickel and cobalt resulting from said digestion step (c) is dissolved in sulfuric acid solution with addition of sulfur dioxide with nickel and cobalt extraction exceeding 90%.

6. The process in accordance with claim 5 wherein the solution resulting from said sulfuric acid dissolution is neutralized to pH 7 to precipitate alumina therefrom.

7. The process in accordance with claim 1 wherein said step (a) is accomplished using an oxygen overpressure of about 25 to about 100 psig.

8. The process in accordance with claim 1 wherein said sodium hydroxide is employed in said oxygen pressure leach in an amount at least stoichiometrically equal to the amount required to convert molybdenum, vanadium and sulfur present in said catalyst slurry to sodium molybdate, sodium vanadate and sodium sulfate.

9. The process in accordance with claim 4 wherein said hydroxyl ion concentration is about 15 to about 35 gpl.

10. The process in accordance with claim 1 wherein oxygen pressure, alkali addition, reaction time and temperature in said pressure leaching step are controlled such that the leach liquor pH at the end of leaching is in the range of about pH 7 to about pH 9.

11. The process for treating an oily, spent hydrodesulfurization catalyst containing aluminum, molybdenum, vanadium, at least one metal from the group consisting of nickel and cobalt, and sulfur which comprises slurrying said catalyst with an aqueous alkali solution from the group consisting of sodium hydroxide and sodium aluminate containing an amount of alkali stoichiometrically at least equivalent to convert the molybdenum, vanadium and sulfur contents of said spent catalyst to sodium molybdate, sodium vanadate and sodium sulfate, oxygen pressure leaching the resulting slurry at a temperature of at least about 200° C. for a time sufficient to oxidize to carbon dioxide substantially all the carbon in said spent catalyst and to dissolve molybdenum and vanadium to provide, at the conclusion of the leach, an aqueous solution having a pH not exceeding about pH 9 and containing no more than about 100 ppm aluminum while producing a solid containing the aluminum, nickel and cobalt, separating the liquid containing said molybdenum and vanadium from said solid, digesting said solid with sodium hydroxide to produce a sodium aluminate solution and a residue containing said nickel and cobalt, removing alumina from said sodium aluminate solution by seeded crystallization and recycling sodium aluminate from said solution to said oxygen pressure leaching step.

12. The method in accordance with claim 11 wherein said sodium hydroxide addition, leaching temperature and time are controlled to yield a leach solution having a pH in the range pH 7 to pH 9 such that the amount of aluminum in the leach solution is less than 50 ppm.

* * * * *